UNITED STATES PATENT OFFICE.

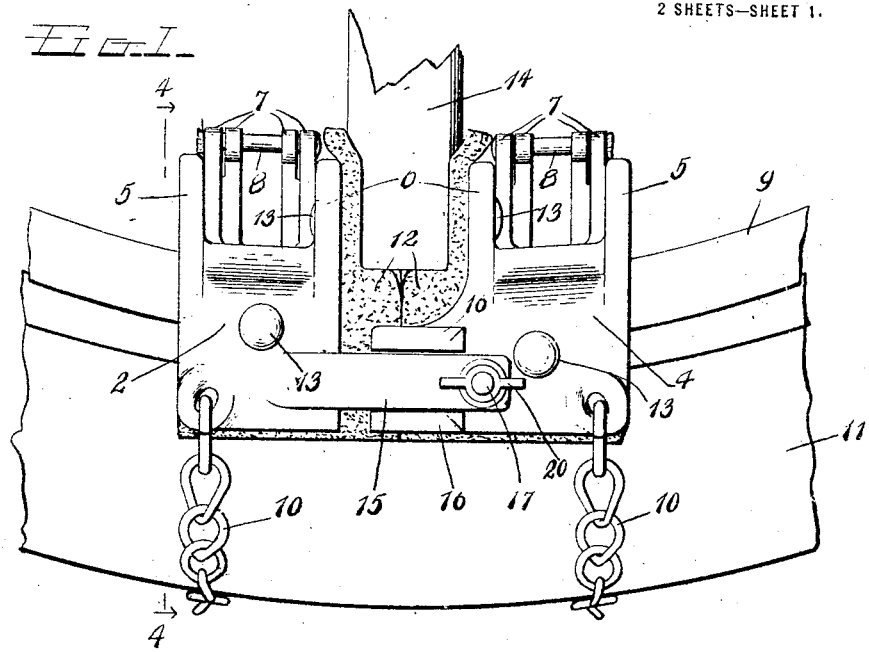
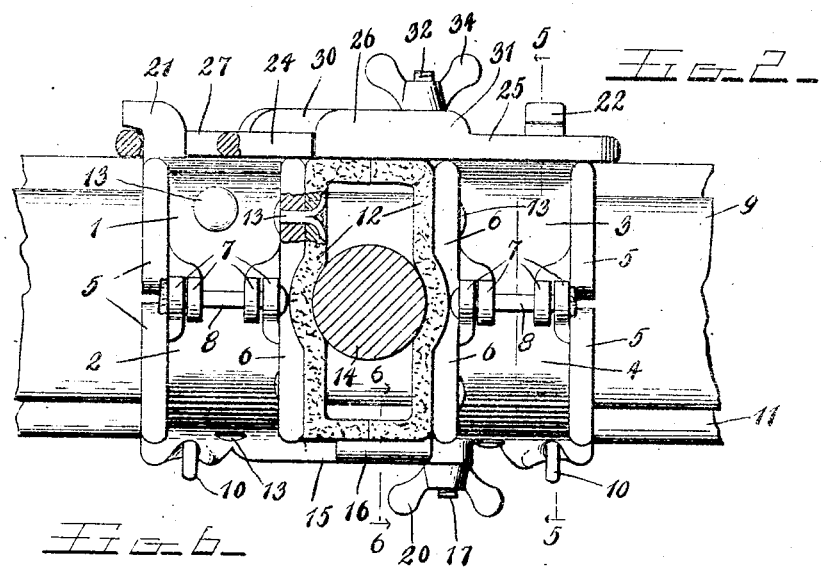
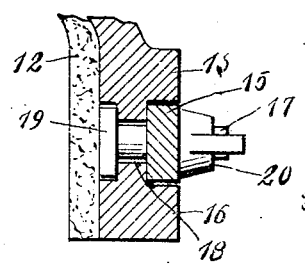

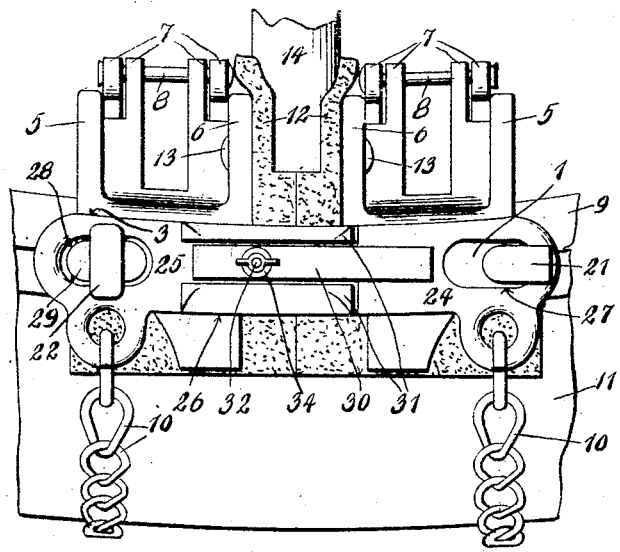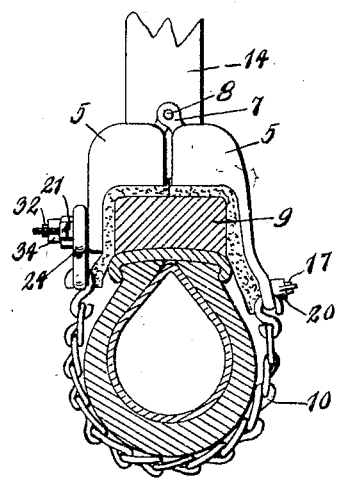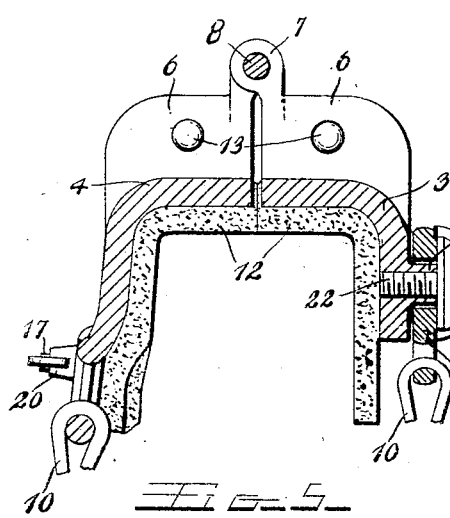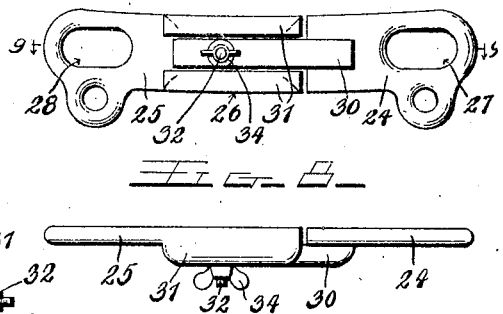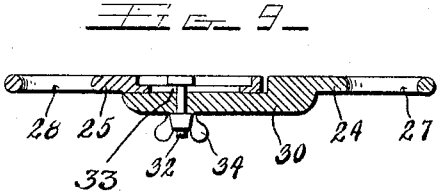

ULYSSUS S. BEAM, OF LIMA, OHIO.

ANTISKID-CHAIN.

1,364,682. Specification of Letters Patent. Patented Jan. 4, 1921.

Application filed June 14, 1920. Serial No. 388,878.

*To all whom it may concern:*

Be it known that I, ULYSSUS S. BEAM, a citizen of the United States, residing at Lima, in the county of Allen and State of Ohio, have invented certain new and useful Improvements in Antiskid-Chains; and I do declare the following to be a full, clear, and exact description of the invention, such as will enable others skilled in the art to which it appertains to make and use the same.

This invention relates to an improved antiskid chain for use upon a tire and one object of the invention is to provide an anti-skid chain device which is so constructed that the clamp or body portion thereof may be securely connected with the wheel rim or felly about a spoke so that the device will be securely but releasably held in place with the chain extending about the tire.

Another object of the invention is to so construct the clamping body portion of this device that it may be adjusted according to the thickness of the spokes and thus have tight engagement with the spokes and to further so construct it that the side sections may have pivotal movement which will permit them to be swung into proper engagement with the rim and felly of the wheel.

Another object of the invention is to so construct this device that the elements forming the clamping body portion may be formed of cast metal and be very strong and durable.

This invention is illustrated in the accompanying drawings, wherein:—

Figure 1 is a view in side elevation showing the improved skid chain device applied to a fragment of an automobile wheel.

Fig. 2 is a view showing the structure of Fig. 1 in plan looking from the inside of the wheel, Fig. 3 is a view similar to Fig. 1 looking at the opposite side of the wheel, Fig. 4 is a sectional view taken along the line 4—4 of Fig. 1, Fig. 5 is an enlarged fragmentary sectional view taken along the line 5—5 of Fig. 2.

Fig. 6 is a fragmentary sectional view taken along the line 6—6 of Fig. 2,

Fig. 7 is an enlarged view showing the removable bar connecting the end portions of the body at one side in elevation, Fig. 8 is a top plan view of this bar, and Fig. 9 is a longitudinal sectional view through the bar taken along the line 9—9 of Fig. 7.

This improved anti-skid chain device will be used upon automobile wheels and truck wheels and as many may be put in place as desired. In the preferred application, four of these devices will be applied to a wheel but it is to be understood that this number may be varied according to the size of the wheel. This device is provided with a clamping body having corner sections 1, 2, 3 and 4 which will be provided with side flanges 5 and 6 and will also be provided with hinge ears 7 through which pivot pins 8 will pass to pivotally connect the corner sections 1 and 3 with the corner sections 2 and 4. It will thus be seen that the side sections which are formed by the corner sections 1 and 3 and 2 and 4 may be swung transversely of a wheel rim or felly 9 and the clamping body thus accommodate itself to the size of the wheel, with the chains 10 passed about the tire 11. A lining or padding 12 is provided and is held in place by rivets 13 and prevents the device from scratching the wheel or cutting the tire when put in place as shown with the spokes 14 extending between the forward and rear sections which will be formed by the corner sections 1 and 2 and 3 and 4.

When this device is in use, it is intended to be clamped about the spokes and in order to do so, it is necessary to adjustably connect the forward and rear sections of the body. Therefore, the corner section 2 has been provided with an arm 15 which extends between guiding ribs 16 of the corner section 4 and is provided with an opening to receive the securing bolt 17. This bolt 17 passes through a slot 18 formed in the corner section 4 between the rib 16 and is provided with a squared head 19 which will hold the bolt against turning and permit the wing-nut 20 to be tightened to securely clamp the arm 15.

At the opposite side of the clamping body, there has been provided a hook 21 and a securing button 22, the hook 21 being carried by the corner section 1 and the button rotatably connected with the corner section 3. This button 22 is provided with a threaded stem 23 which is screwed into a threaded socket formed in the corner section as shown in Fig. 5 so that the button may be tightened. It is, of course, understood that it is not necessary to entirely remove the button when in use. The chains 10 are connected with the end portions 24 and 25 of a connecting bar which is indicated in general by the numeral 26, the bar being provided at one end with an eye 27 to receive the hook 21 and its opposite end with an eye 28 to receive the shank 29 carrying the button 22. This eye 28 is of sufficient length to permit the button to pass through the eye when the button is turned longitudinally of the clamp body, but is relatively narrow so that when the button is tightened and is in the position shown in Fig. 5, its end portions will engage the outer face of the bar and hold the bar in place. In order to permit secure clamping about the spokes, this bar 26 must be adjustable in length and, therefore, the end portion 24 has been provided with an arm 30 which extends between the ribs 31 of the end portion 25. This arm 30 carries a bolt 32 which extends through a slot 33 formed in the end portion 25 between the ribs 31. This bolt is also provided with an enlarged and squared head which holds the bolt against rotation when the wing-nut 34 is tightened.

When this device is in use, the bar 26 is released from the hook 21 and button 22 and the chains will be released from one side portion of the clamping body. The clamping body can then be put in place with the spokes positioned between the forward and rear sections thereof. The side sections will swing down into engagement with the rim as shown in Fig. 4 and the end sections can then be moved toward each other, for tight engagement with the spoke, it being understood that the securing bolts will be loosened to permit of this sliding movement. The bolts will then be tightened and the device will be securely clamped to the spokes and also held in tight engagement with the side portions of the rim and felly. The chains will then be passed about the tire and the bar put in place upon the hook and shank 29. After the bar 26 is in place, the button will be turned to the securing position shown in Fig. 5 and the bolt 32 tightened to secure the bar against any longitudinal movement. It will thus be seen that this device will be securely but releasably held in place and that it may be easily and quickly put in place or removed. As previously stated, any number of these devices may be put in place upon a wheel according to the size of the wheel. It will be further noted that these devices will be provided with chains which will be either relatively heavy chains for use in connection with heavy trucks or relatively light chains for use in connection with pleasure cars.

What is claimed is:—

1. An anti-skid chain device comprising a wheel engaging clamping body having corner sections, the corner sections at one side of the body being hingedly connected to the corner sections of the opposite side and providing forward and rear sections for the body, means adjustably connecting the corner sections at one side of the body, means adjustably and releasably connecting the corner sections at the opposite side of the body, and chains connected with the corner sections at one side of the body and connected with the means releasably connecting the corner sections of the opposite side of the body.

2. An anti-skid chain device comprising a clamping body having corner sections, the corner sections of one side of the body being pivotally connected with the corner sections of the opposite side to provide forward and rear sections for the body, an arm extending from a corner section of one side and extending in overlapping relation to its cooperating corner section, a securing bolt carried by the arm and passing through a slot in the second corner section to slidably connect the arm with the second section and releasably hold the arm in a set position thereon, chains connected with the corner section connected by said arm, and a longitudinally adjustable bar carried by the opposite end portions of the chains and releasably connected with the corner section of the opposite side portion of the body.

3. An anti-skid chain device comprising a wheel engaging clamping body having corner sections, the corner sections of one side being hingedly connected with the corner sections of the second side to provide end sections for extending transversely of a wheel felly upon opposite sides of a spoke, means adjustably connecting the corner sections of one side of said body, a longitudinally adjustable bar releasably connected with the corners sections of the opposite side, and chains connected with the corner sections of the first side portion of the body and connected with said bar.

4. An anti-skid chain device comprising a wheel clamping body having corner sections, the corner sections of one side being hingedly connected with the corner sections of the second side, one corner section of one side having longitudinally extending guiding ribs and a slot between the ribs, an arm extending from the second corner section of the said side portion and extending between the ribs and provided with an opening registering with the slot, a securing bolt extending through the slot and opening of the arm and held against rotation and having a securing nut for engaging the arm, tire chains connected with the last mentioned corner sections, and means carried by the chains for releasably and adjustably connecting the corner sections at the opposite side of the body.

5. An anti-skid chain device comprising a clamping body having corner sections, the corner sections of one side being hingedly connected with the corner sections of the second side, and one side having its corner sections adjustably connected, a hook extending from a corner section of the second side, tire chains connected with the corner sections of the first side, a bar having end portions carried by the chain and adjustably connected to provide a longitudinally adjustable bar, a securing element carried by the second corner section of the second side portion of said body, and said bar having its end portions provided with eyes receiving the hook and securing element.

6. An anti-skid chain device comprising a wheel clamping body having corner sections with the corner sections of one side hingedly connected with the corner sections of the second side, a hook carried by a corner section of one side, a securing button having a threaded stem screwed into a threaded socket formed in the second corner section of said side, a bar having end portions provided with eyes receiving the hook and button, one end portion of the bar being provided with a longitudinally extending slot and the second end portion having a tongue extending in overlapping relation to the first end portion and provided with an opening registering with the slot, a securing bolt extending through the slot and opening of the arm to adjustably and slidably connect the arm with the first end portion, means adjustably connecting the corner sections of the second side portion of said body, and chains connected with the last mentioned corner sections and with the end portions of said bar.

7. An anti-skid chain device comprising a clamping body having corner sections, the corner sections of one side being hingedly connected with the corner sections of the second side to provide end sections adjustably connected, the corner sections of one side being adjustably connected, longitudinally adjustable means releasably connecting the corner sections of the opposite side, and tire chains connected with the body.

In testimony whereof I have hereunto set my hand in the presence of two subscribing witnesses.

ULYSSUS S. BEAM.

Witnesses:
  W. H. Leete,
  Melvin C. Light.